United States Patent
McGinnis et al.

[11] Patent Number: 5,803,235
[45] Date of Patent: *Sep. 8, 1998

[54] IDLER ROLLER CONVERSION SYSTEM WITH IMPACT SHELL

[76] Inventors: Herbert E. McGinnis, deceased, late of Akron, Ohio; by Mary L. McGinnis, executor, 1638 S. Cleveland-Massilon Rd., Akron, Ohio 44321

[*] Notice: The terminal 10 months of this patent has been disclaimed.

[21] Appl. No.: 387,173

[22] Filed: Feb. 13, 1995

[51] Int. Cl.$^6$ .................................................. B65G 39/10
[52] U.S. Cl. ............................ 198/843; 474/94; 474/902; 492/21
[58] Field of Search ........................... 198/843; 193/35 B, 193/35 F, 37; 424/94, 197, 902, 903; 492/21, 45

[56] References Cited

U.S. PATENT DOCUMENTS

| | | | |
|---|---|---|---|
| 2,484,752 | 10/1949 | Searles | 198/843 |
| 2,624,574 | 1/1953 | Camras | 271/2.3 |
| 3,416,638 | 12/1968 | Buck | 193/37 |
| 3,649,985 | 3/1972 | Hunt | 492/21 |
| 3,753,541 | 8/1973 | Grueber et al. | 244/137 |
| 3,786,549 | 1/1974 | Pott | 29/116 |
| 3,900,913 | 8/1975 | Drumm | 492/21 |

FOREIGN PATENT DOCUMENTS

| | | | |
|---|---|---|---|
| 3205609 | 8/1983 | Germany | 198/843 |
| 563339 | 7/1977 | U.S.S.R. | 198/843 |

*Primary Examiner*—Joseph E. Valenza
*Attorney, Agent, or Firm*—Emerson & Associates

[57] ABSTRACT

A roller arrangement for use in a conveyance system includes a generally cylindrical roller body which has a pre-determined diameter, an outer surface, and a central passage. A shaft extends through the central passage, the roller body is rotatable about the shaft. An expander circumscribes the roller body. An impact shell is connected outwardly to the expander. The impact shell includes a cover made of low modulus elastomeric material and a backing layer made of high modulus elastomeric material. A first compression plate, a second compression plate, and a compression ring are mounted to the roller so that the compression ring is mounted between the first plate and the second plate.

9 Claims, 5 Drawing Sheets

IDLER ROLLER CONVERSION SYSTEM WITH IMPACT SHELL

BACKGROUND OF THE INVENTION

1. Field of Invention

This invention pertains generally to the art of conveyor belt rollers, and more specifically to the conversion of a conventional idler roller to an impact roller by means of an elastomeric compression shell.

2. Description of Related Art

Conveyance systems utilize various types of rollers depending on their intended use within the system. Idler rollers are used to support and move a loaded conveyor belt. Impact rollers, also known as buffers, are utilized as energy absorbers. Their purpose is to minimize damage to the conveyor belt as it is loaded and to lessen the stress on the roller end supports.

Conventional idler rollers have been equipped with elastomeric rings to enable them to be used as impact rollers. For example, U.S. Pat. No. 3,786,549 to Pott provides a roller which comprises an outer elastomeric layer which is allegedly able to act as a shock absorber. However, the prior art rollers have not proven entirely satisfactory. Upon use and aging of the rings, their ability to perform as intended is significantly diminished.

The present invention addresses the aforementioned problem and others, namely that the mere addition of elastomeric rings to conventional rollers is not more economical than having to replace the rollers as prescribed by Pott. The present invention contemplates the conversion of conventional idler rollers into elastomeric covered impact rollers through the addition of an add-on impact shell. Furthermore, the impact shell combines rigid or semi-rigid support with flexible energy absorbing qualities.

SUMMARY OF THE INVENTION

In accordance with the present invention, an elastomeric compression shell for a conveyor belt idler roller is provided.

More particularly, in accordance with the invention, a conventional idler roller is converted into an impact roller by means of the addition of an elastomeric impact shell.

According to one aspect of the invention, a roller arrangement comprising a generally cylindrical roller body rotatable about a central shaft is equipped with an elastomeric impact shell by the addition of angularly placed expanders.

According to another aspect of the invention, each expander comprises an elastomeric, compressible ring which is sandwiched between two compression plates.

According to another aspect of the invention, the expander further comprises a means for compressing the ring between the compression plates. In one embodiment of the invention, the compression is performed by a plurality of tightening bolts. The compression plates and the elastomeric ring contain holes which are aligned so that a bolt can extend through the first compression plate, through the ring, and through the second plate. The bolt is fitted with a nut or other means for tightening.

According to another aspect of the invention, the roller body is fitted with an angularly placed expander on each end. The action of the tightening bolts causes the elastomeric ring to be compressed between the two plates. The elastomeric material is extruded inwardly to firmly grip the outer surface of the roller body.

According to another aspect of the invention, the roller arrangement comprises a hollow cylindrical impact shell being outward of the expanders. The action of the tightening bolts further causes the elastomeric ring to be extruded outwardly to firmly grip the inner surface of the shell.

According to another aspect of the invention, the outer shell comprises two layers. A first backing layer comprises a high modulus elastomeric material such as polyurethane; a second covering layer comprises a low modulus elastomeric material such as rubber. The backing layer may be rigid or semi-rigid.

According to another aspect of the invention, the outer surface of the elastomeric cover has circumferential ridges.

According to another aspect of the invention, the backing layer may comprise a one-piece tube or it may comprise two or more pieces being joined together to form a tube.

One advantage of the present invention is that a conventional steel idler roller can be converted to an impact idler.

Other advantages of the present invention includes improved durability, better performance, and lower operating costs.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
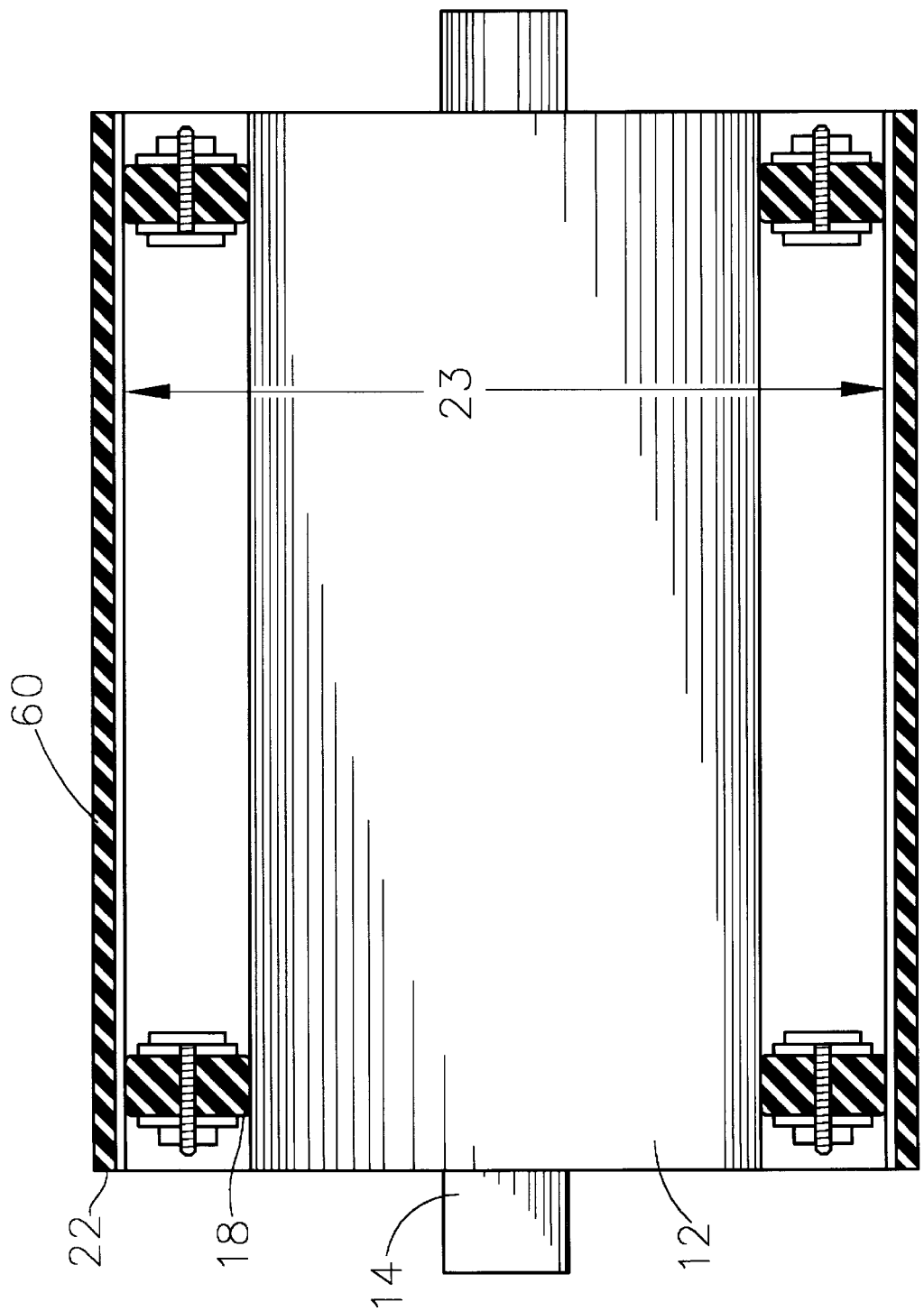
FIG. 1 is a cross-sectional view of a roller arrangement according to the invention.

Referring now to the drawings, which are for purposes of illustrating a preferred embodiment of the invention only, and not for purposes of limiting the invention, FIG. 1 shows a roller body 12 which is rotatable about a shaft 14. In the preferred embodiment, the roller body 12 is a steel idler roller. The roller body 12 is fitted with a plurality of annular expanders 18. In the preferred embodiment, two expanders 18 are used, one at each end of the roller body 12. The expanders 18 connect an impact shell 22 to the roller body 12. The impact shell 22 is essentially tubular having a axially extending void region. The impact shell 22 has an inner diameter 23 sufficiently large to allow its placement around the annular expanders 18.

Figure 2:
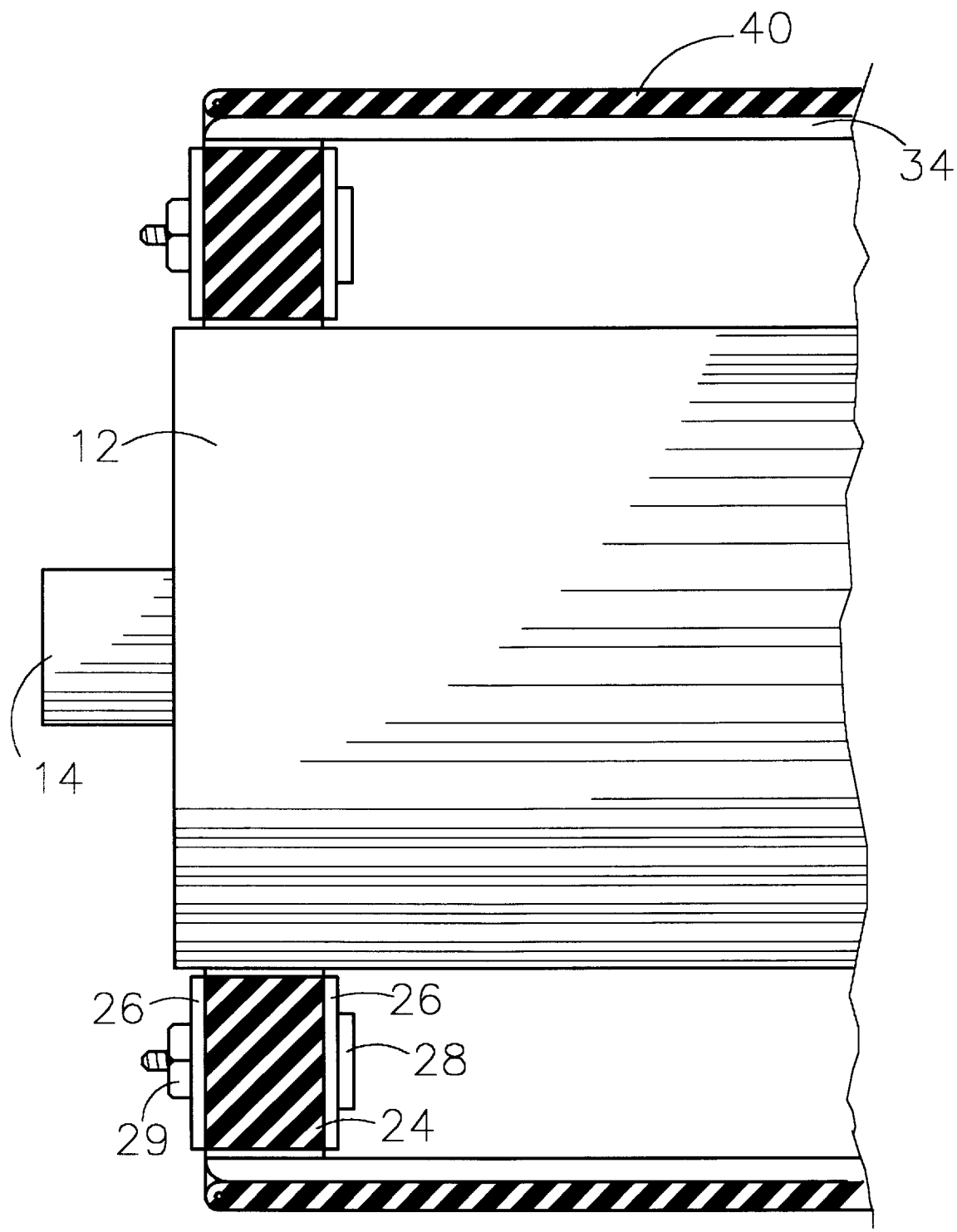
FIG. 2 is a view of an end portion of the roller arrangement.

Referring now to FIG. 2, the expander 18 comprises an elastomeric compression ring 24 which is positioned between two compression plates 26. A means for compressing the compression ring 24 between the plates 26 also acts to hold the members of the expander 18 together. In the preferred embodiment, the means for compressing is a plurality of tightening bolts 28 and nuts 29.

The impact shell 22 comprises a backing layer 34 and an elastomeric cover 40. The backing layer 34 may be formed of rigid or semi-rigid material. In addition, the backing layer 34 may be of one piece tubular construction or it may be of split-shell construction fashioned from two or more pieces which form a tube upon connecting them. In the preferred embodiment, the backing layer 34 has a split shell construction being formed of high modulus polyurethane. The elastomeric cover 40 in the preferred embodiment comprises a low modulus elastomeric material such as rubber. The roller arrangement according to the invention provides energy absorbing qualities in the elastomeric cover 40 of the impact shell 22 while also providing lightweight support in the rigid or semi-rigid backing layer 34 of the impact shell.

Figure 3:
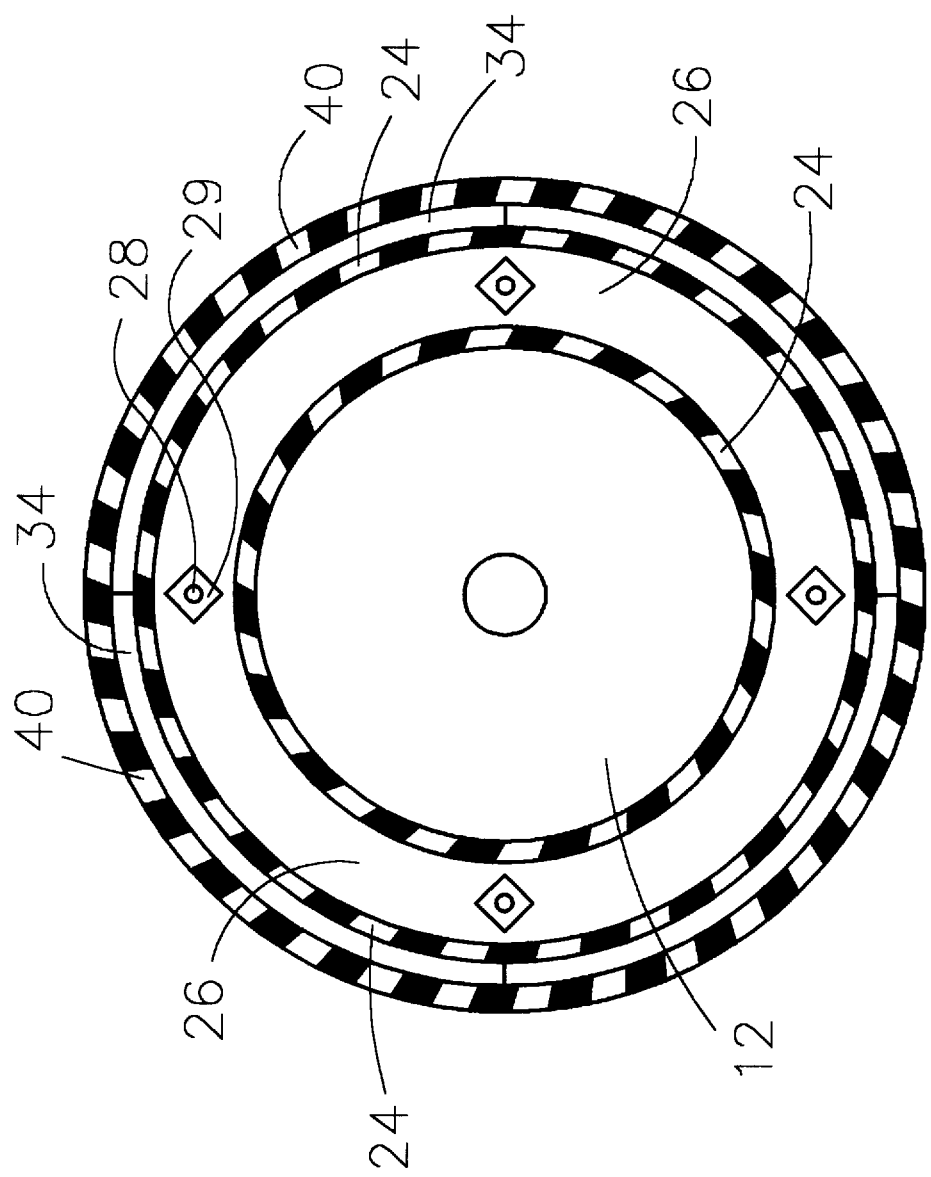
FIG. 3 is an end view of a roller arrangement according to the invention.

An end view of the roller arrangement is shown in FIG. 3. This view shows a roller body 12, an expander 18, and an impact shell 22. The roller body 12 is in contact with an inner edge 42 of the a compression ring 24 which protrudes inward of the compression plates 26. The outer edge 44 of the compression ring 24 protrudes outward of the compression plates 26 to contact the impact shell 22. The compression plates 26 and the compression ring 24 contain a plurality of coaxial holes 46 therethrough. Tightening bolts 28 extend through the holes 46. In addition to holding the members of the expander 18 together, the tightening bolts 28 also serve as a means for compressing the elastomeric compression ring 24 between the compression plates 26. Upon compression, elastomeric material from the ring 24 is extruded inwardly to firmly grip the roller body 12 and also outwardly to firmly grip the impact shell 22.

Figure 4:
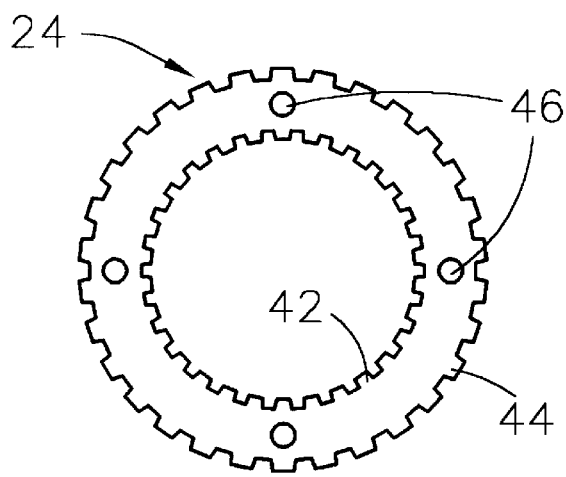
FIG. 4 is a side view of an elastomeric compression ring according to the invention.

FIG. 4 shows a side view of the elastomeric compression ring 24. In the preferred embodiment, the compression ring 24 comprises compressible elastomeric material. A plurality of holes 46 pass through the ring 24. The inner edge 42 comprises a series of ridges 50 which contribute to the gripping action of the ring 24 against a roller body. The outer edge 44 of the ring 24 also comprises a series of ridges 52 to enhance the gripping ability of the ring 24 against the impact shell 22 upon compression of the ring 24.

Figure 5:
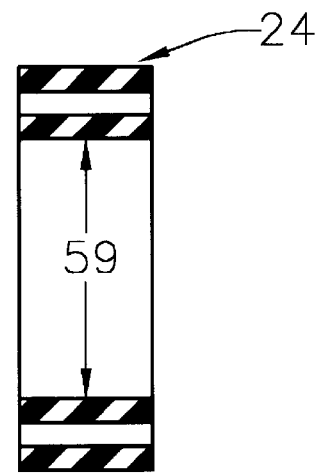
FIG. 5 is a cross section of an elastomeric compression ring.

A cross-sectional view of the compression ring 24 is shown in FIG. 5. The inner diameter 54 of the ring 24 is of sufficient size to allow passage of the roller body 12 therethrough.

Figure 6:
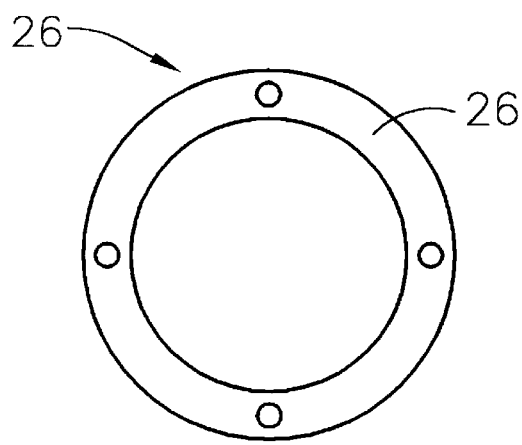
FIG. 6 is a side view of a compression plate according to the invention.

FIG. 6 shows a side view of a compression plate 26 according to the invention. When assembled, the holes 46 in the plate 26 are coaxial with the holes in the compression ring 24. The plate 26 is fashioned of rigid material which is able to exert a compressing force on the elastomeric compression ring 24 when acted upon by a means for compressing, such as the tightening bolts in the preferred embodiment.

Figure 7:
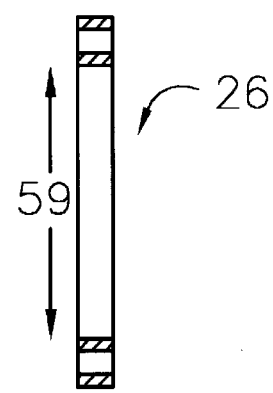
FIG. 7 is a cross-sectional view of a compression plate.

The cross-sectional view of a compression plate 26 is shown in FIG. 7. The plate 26 has an inner diameter 58 which is slightly larger than the inner diameter 54 of the compression ring 24, thereby allowing the inner edge 42 of the compression ring 24 to extend inward of the compression plate 26. The outer diameter of the compression plate 26 is slightly less than the outer diameter of the compression ring 24, thereby allowing the outer edge 44 of the compression ring 24 to extend outward of the compression plate 26 to contact the surface of the impact shell 22.

Figure 8:
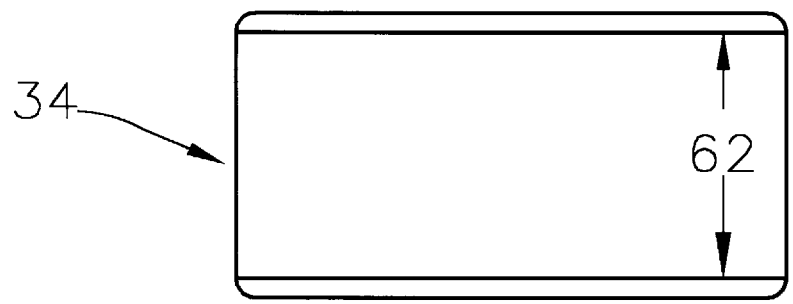
FIG. 8 is a cross-sectional view of a backing layer according to the invention.
Figure 8A:
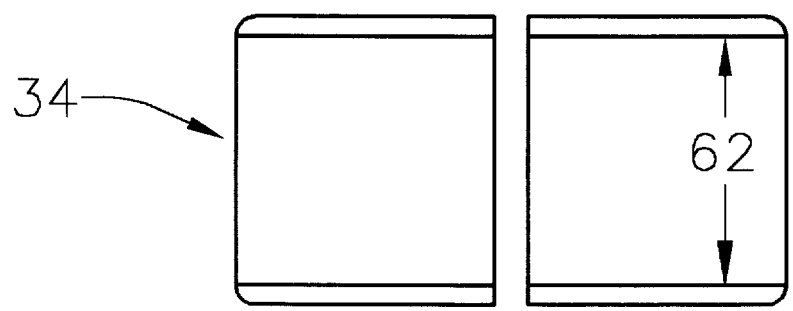
FIG. 8A is a cross-sectional view of an alternate embodiment of the backing layer comprising two sections.

A cross-sectional view of a backing layer 34 of the impact shell 22 is shown in FIG. 8. The inner diameter 62 of the backing layer 34 is of sufficient length to allow the impact shell 22 to fit around the roller body 12 when said body is equipped with expanders 18.

Figure 9:
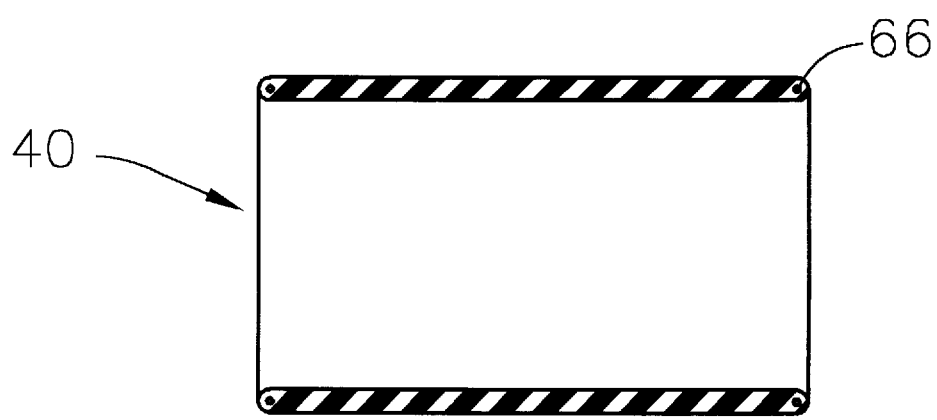
FIG. 9 is a cross-sectional view of an elastomeric cover according to the invention.

FIG. 9 shows a cross-sectional view of a cover 60 for the impact shell 22. In the preferred embodiment, bead wires 66 extend circumferentially about the ends of the cover 60 to anchor the cover 60 to the backing layer 34.

The invention has been described with reference to the preferred embodiment. Obviously, modifications and alterations will occur to others upon a reading and understanding of the specification. It is intended by the applicant to include all such modifications and alterations insofar as they come within the scope of the appended claims or the equivalents thereof.

Having thus described the invention, it is now claimed:

1. A roller arrangement for use in a conveyance system comprising:
    a continuous cylindrical roller body, said body having a predetermined diameter, a predetermined length, an outer surface, and a central passage;
    a shaft, said shaft extending through said central passage, said roller body being rotatable about said shaft;
    an expander, said expander being annular about said roller body and,
    an impact shell, said shell being outward of said expander.

2. The roller arrangement of claim 1 wherein said expander comprises:
    a first compression plate;
    a second compression plate;
    a compression ring, said compression ring being between said first plate and said second plate having an inner and an outer edge; said inner and outer edges having a plurality of ridges.

3. The roller arrangement of claim 2 wherein said expander further comprises a compressing means for compressing said compression ring between said first plate and said second plate.

4. The roller arrangement of claim 3 wherein said compression means is a plurality of tightening bolts.

5. The roller arrangement of claim 4 wherein said first compression plate, said compression ring, and said second compression plate have concurrent holes, said tightening bolts extending therethrough.

6. The roller arrangement of claim 2 wherein said compression ring comprises:
    an inner edge, said inner edge protruding inwardly of said compression plates; and,
    an outer edge, said outer edge of said compression ring protruding outwardly of said compression plates and contacting said impact shell.

7. The roller arrangement of claim 2 wherein said impact shell comprises:
    a cover, said cover being low modulus elastomeric material; and,
    a backing layer, said backing layer being high modulus elastomeric material.

8. The roller arrangement of claim 7 wherein said cover comprises an outward surface, said surface having circumferential ridges.

9. The roller arrangement of claim 7 wherein said backing layer comprises two sections, said sections being connected to form a tube.

* * * * *